Oct. 31, 1961   T. F. McGRATH ET AL   3,006,978
HIGH TEMPERATURE THIN FILM THERMOCOUPLE
Filed Nov. 14, 1958
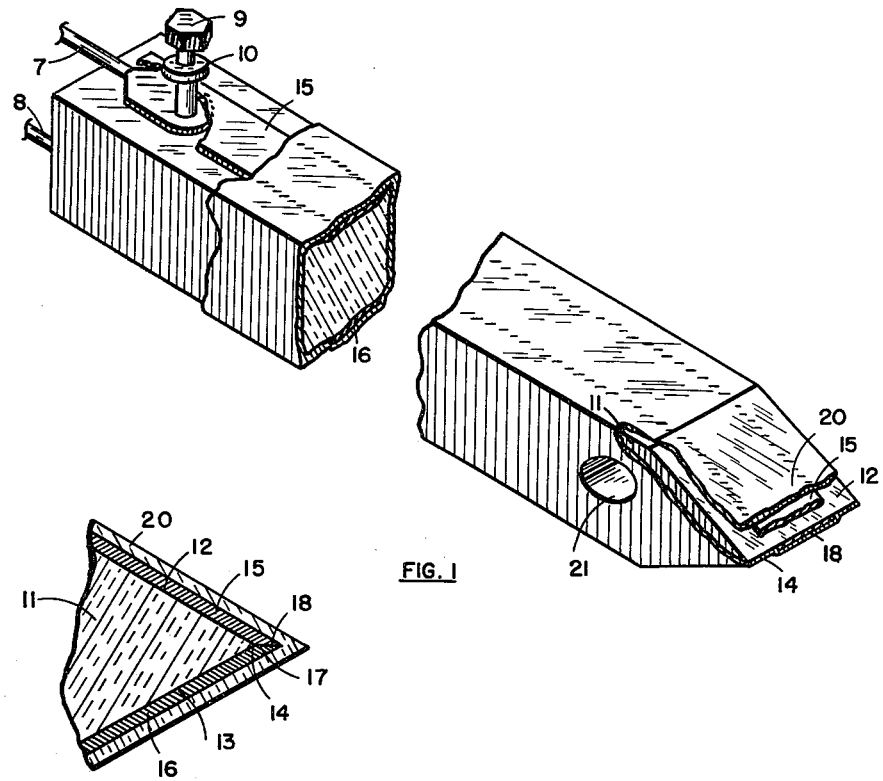
FIG. 1
FIG. 2
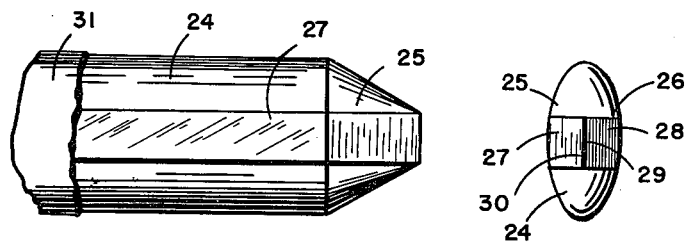
FIG. 3
FIG. 4
INVENTORS.
THOMAS F. MCGRATH
JOHN C. SESSLER
BY
AGENT

United States Patent Office 3,006,978
Patented Oct. 31, 1961

3,006,978
HIGH TEMPERATURE THIN FILM THERMOCOUPLE
Thomas F. McGrath and John Charles Sessler, Canoga Park, Calif., assignors to North American Aviation, Inc.
Filed Nov. 14, 1958, Ser. No. 773,934
7 Claims. (Cl. 136—4)

This invention relates to a thermocouple and more specifically to a thermocouple which is adapted for high temperature use. More particularly, this invention relates to a thermocouple which is capable of operating in high velocity rocket exhaust gases to produce rapid and accurate outputs in turbulent 5000° F. conditions.

In our modern missiles it is quite important that the fuel flow to the rocket engine be controlled very accurately. One means of doing this is by measuring the temperature of the exhaust gases which are in the neighborhood of 5000° F., however, until this time, designers have been forced to use other types of fuel control which are less accurate because no means was available to measure the temperature of the exhaust gases accurately enough. It can be seen that any such thermocouple must be rugged so that it can survive the supersonic turbulence of the exhaust gases. Also, in order to adequately control the engine fuel flow, the temperature measuring means must have a rapid response to changes of the exhaust gases in the order 0.1 second. Further, the thermocouple must not only have a rapid response and be rugged, but it must be accurate at least to within 1 percent of the true temperature because at the high temperatures involved, that is, 5000° F., even a 1 percent inaccuracy is 50° F. At the present time, no thermocouple is available or has been suggested which will operate successfully and fulfill the requirements that are needed. This is due partially to the fact that all but a few of the materials which are presently available melt below 5000° F. The main reason that no thermocouple is presently available is because even if the few materials capable of standing such temperatures were substituted into such thermocouples, they would not operate successfully. This is because the materials which stand the 5000° F. heat such as tungsten or a graphite are extremely brittle and would be broken by the expansion of the core of the thermocouple as it is heated from room temperature to 5000° F. and down again. Therefore, although the structures for thermocouples which have been previously proposed are satisfactory for lower temperature operation, e.g., below 2000° F., such structures will not work in 5000° F. turbulent exhaust gases. The novel thermocouple described more specifically herein overcomes the difficulties of the brittleness of such high temperature materials by its novel structure which includes the idea of providing "thin film" thermocouple legs which are less than a mil thick and are able to expand, contract, and flex with the core of the thermocouple without breaking.

The previously suggested thermocouples also have the disadvantage that if such structure is strong enough to withstand the buffeting forces of turbulent gases, such structure is so heavy that the response time of the thermocouple is too slow. As is known in the art, the response time of a thermocouple is mainly a function of the mass of the thermocouple in relation to the area of the surface of the two thermocouple legs which contact each other. This is because the output of the thermocouple is directly determined by the temperature of the junction between the two legs of the thermocouple. Therefore, it is seen that the more mass there is around the area of the junction, the more mass there is that must be heated up or cooled before the junction of the the thermocouple can adjust to any change in the temperature of the ambient conditions. The present invention overcomes these disadvantages due to its novel structure. As will be pointed out more specifically below, the present invention provides that the two legs of the thermocouple intersect each other at an angle whereby the area of the juncture of the two legs is increased thereby permitting the use of smaller thermocouple conductors. Also, the legs are shaped as thin, flat conductors whereby the proper amount of current can be carried by a very minute amount of mass because current flows more easily on the surface of a conductor than through the center of a conductor.

Therefore, it is an object of this invention to provide a thermocouple.

It is a further object of this invention to provide a high temperature thermocouple.

It is a further object of this invention to provide a simple rugged accurate thermocouple which has a rapid response for use in temperatures of 5000° F.

More specifically, it is an object of this invention to provide a simple rugged thermocouple having "thin film" thermocouple conductors which permit the use of brittle thermocouple materials capable of withstanding the effects of 5000° F. temperatures.

Other and further objects of this invention will become apparent in the detailed description below wherein:
FIG. 1 shows a partially cutaway isometric view of the modification of the subject thermocouple;
FIG. 2 shows a cross-sectional detail view of the tip of the thermocouple shown in FIG. 1;
FIG. 3 shows a side view of a second modification of the subject thermocouple;
And FIG. 4 shows a view of the front end of the thermocouple shown in FIG. 3.

Referring to FIG. 1, it is seen that a core 11 is provided with a first and a second tapered surface portion 12 and 13 (FIG. 2) respectively located at its forward end which meet at the common forward edge 14. The conductors 7 and 8 are mounted to the core 11 at its rearward end and lead to conventional apparatus which will measure the E.M.F. generated and use that E.M.F. for control purposes or indicating temperature. The terminals of the conductors 7 and 8 are mounted to the core by means of insulative beryllia bolt 9 which extends through the washer 10 and a bore through the core in conjunction with a nut (not shown) on the far side of the core.

A first thermocouple material 15 is provided affixed to the first tapered portion 12 and extending rearwardly along side of the core 11 of the thermocouple to the rearward end of the core where it is connected to the terminal of the conductor 7 in a manner which will be described below. A second thermocouple material 16 is provided on the second tapered surface portion 13, as shown in FIG. 2, and extends rearwardly along the core 11 to the rearward end of the core where it is connected to the terminal (not shown) of the conductor 8. These two thermocouple legs meet at their surfaces 17 and 18, respectively, forming the hot juncture of the thermocouple. As is commonly known in the art, these two legs of the thermocouple are of different materials in order that an E.M.F. will be developed by heat. A dense protective insulation coating 20 is provided around the outside of the core and the legs of the thermocouple for protective purposes which will be described in more detail below.

The core 11 of the present thermocouple can be made of any one of several insulative materials and also can take any one of several shapes. The particular model thermocouple shown is used for measuring the temperature of an internal component in a rocket engine and, therefore, has a square cross section of one-quarter inch on a side and is approximately 12 inches long. There are several materials which can withstand the temperatures involved and form a sufficiently rigid support for the legs of the thermocouple, but it is preferred that the core 11 be made of a refractory insulator material such as magnesia (MgO), beryllia (BeO), thoria (ThO$_2$), boron nitride, or stabilized zirconia (ZnO$_2$). These materials will withstand the temperatures involved and have sufficient rigidity so that the legs of the thermocouple will not be broken because of flexing of the core. As mentioned above, the core 11 is provided with a first tapered surface portion 12 and a second tapered surface portion 13 at its forward end which meet at the common edge 14. Since the core has a square cross section, these tapered surface portions are planar; however, it can be seen that these tapered surface portions could be somewhat curved as the important thing is that they taper towards each other and meet at the common edge 14. The common edge 14 of the modification of FIG. 1 is substantially straight in order that the hot junction at the point of the thermocouple might be pressed against a flat surface, but the junction can be shaped to insure full contact the particular item of which it is desired to measure the temperature.

As can be seen, as the included angle between the tapered surfaces decreases, the relation of the mass of the thermocouple legs and the thermocouple core to the area of the junction between the two legs also decreases. Therefore, it is desirable to decrease this angle as much as possible while preserving the required ruggedness for the particular application. The present modification has an included angle between the tapered portions 12 and 13 of approximately 60° because in the application for which it is designed, it will be subjected to the vibration of the operation of the rocket motor. If the thermocouple were to be used in less severe operation, the angle could be much less, e.g. of the order of 25°. However, for the thermocouple to have the most universal capabilities, it is best if the included angle is in the range of 25° to 70°. As shown, a heat dam in the form of the bore 21 extending through the core 11 may be provided adjacent the hot junction displaced a small distance rearwardly of it. The bore impedes the flow of heat from the main rearward portion of the core 11 to the hot junction at edge 14 and vice versa, thereby increasing the rapidity of response as well as preventing errors which might occur when the temperature of the rearward portion of the core 11 becomes greatly different from the temperature of the hot junction.

As mentioned above, the particular thickness dimension of the film of the thermocouple is a main factor in enabling the subject invention to work at the extreme temperatures involved. The embodiment shown in FIG. 1 provides that the thermocouple legs 15 and 16 each be one-eighth inch wide and approximately 4 microns thick. By making each leg in such a film-like manner, the leg will expand and contract with the core 11 of the thermocouple even though the particular material of which the leg is made is very brittle. There are several combinations of materials which will operate satisfactorily at the high temperatures involved and generate the proper E.M.F. Examples of such combinations are set out in Table 1 below with the upper limit of temperature at which the particular combination can be used.

Table 1

| Combination: | Approximate upper limit |
|---|---|
| Boron carbide and graphite | 5400° F. |
| Tungsten and graphite | 5000° F. |
| Tungsten carbide and tungsten | 5000° F. |
| Tungsten and tungsten-molybdenum | 5200° F. |
| Rhenium and tungsten | 5500° F. |
| Carbon and silicon carbide | 5400° F. |
| Carbon and tungsten carbide | 5000° F. |
| Carbon and graphite | 5000° F. |
| Carbon and molybdenum carbide | 4700° F. |
| Tungsten and molybdenum | 4500° F. |
| Tantalum and molybdenum | 5000° F. |

As can be seen, the materials which are able to stand the temperatures involved and generate the proper E.M.F., i.e., tungsten, molybdenum, tungsten carbide, graphite, carbon, rhenium, boron carbide, molybdenum carbide and alloys of the above metals are very brittle and therefore the thin film conductor principle must be used. The exact thickness required for a particular thermocouple conductor leg will vary according to the brittleness of the particular material used and also the difference between the coefficient of expansion of the particular core material used in combination with that thermocouple conductor. For example, if the coefficient of the expansion of the core and conductor are nearly the same, and the conductor material is one of the less brittle of the above group, a thicker leg, e.g. one mil, may be used. One mil is approximately the upper limit of the thickness of the thermocouple conductor on the shaft in the area of the hot junction. The material may be made thicker at a point away from the hot junction if the core is cooled at that point; however, means for such cooling complicates the structure as well as creating an error in the measurement due to the excess heat flowing away from the hot junction which would have to be compensated for.

The thin film may be put on by processes such as the flame spray or by vapor deposition or by painting on the particular conductor. A suitable flame spray process known in the art is disclosed in Patent No. 1,756,381 or 2,389,702. This process may be used to apply the metallic thermocouple leg, for example, pure tungsten powder could be fed into the flame spray and thereby a very thin film of tungsten may be affixed to the thermocouple core 11. Alternatively the conductor particles could be suspended in a resinate solution, which will volatilize easily. This solution is painted on the proper portions of the thermocouple core and then the thermocouple core could be heated to drive off the resin leaving only the thin film conductors 15 and 16 on the core 11. The molybdenum may be applied in the proper position by painting on commercial molybdenum carbonyl, Mo(CO)$_6$ and then heat treating the thermocouple to drive out the carbon dioxide leaving only molybdenum on the proper leg.

No matter which of the above mentioned methods are used, it is best if the thermocouple core is masked off except for the area on which one leg of the thermocouple is desired to be coated and the coating then applied. At that time the forward junction edge, either 17 or 18, is finished to provide an interface extending substantially parallel to a plane which bisects the angle of intersection of the two thermocouple conductors. Then the thermocouple is remasked so that only the area to which the other conductor is to be affixed is exposed to receive the coating by any one of the above mentioned processes. As the dimensions of the film conductors are very small, it is hard to prevent overlapping of the two legs during the coating process. Therefore, the juncture is inspected after the coating process and to remove as much overlapping material as possible since such overlapping increases the mass of the thermocouple and slows the response time of the thermocouple.

As mentioned at the beginning of the detailed description, the thin film thermocouple conductor legs 15 and 16 are connected to the conductors 7 and 8 respectively. This may be done by a number of ways. In the modification shown, the conductors 7 and 8 are bolted to the core 11 by means of insulative bolt 9 and a cooperating nut, and the respective thin film thermocouple conductors 15 and 16 are affixed on the terminals of the conductors 7 and 8 at the same time that the conductors 15 and 16 are affixed to the core 11. The thin film thermocouple conductor 15 has been partially cut away to show how it has been deposited on the terminal of conductor 7. Alternatively, the thermocouple conductors 15 and 16 may be deposited first in any of the manners described above and then the terminals of the conductors 7 and 8 may be held against the respective conductors by the bolt 9.

After the legs of the thermocouple have been affixed, the hot juncture properly finished, and the conductors 7 and 8 have been electrically connected to the thermocouple conductors 15 and 16, a thin protective coating 20 is applied over the whole thermocouple. This coating should be less than 3 or 4 microns at the tip in order not to impede rapid response, but may be more at the rearward portions of the thermocouple. In some situations, a protective coating may not be needed right at the hot junction. Such a protective coating is needed for two reasons. First, at the high temperatures involved, the gases surrounding the thermocouple tend to be electrically conducting and therefore would tend to short out the two legs of the thermocouple at a position away from the hot juncture thereby giving inaccurate reading. Also, since the subject thermocouple is primarily to be used in turbulent gases, an insulating coating, such as coating 20, protects the thermocouple legs from erosion by the gases. Therefore, such coating should be of materials which are electrically insulative and must have characteristics which enable them to withstand the temperatures involved. In addition, the materials must be fairly dense in order that they prevent gas permeation which would cause shorting of the legs of the thermocouple since the coating is only several microns thick. Refractory materials such as boron nitride, thoria, or beryllia have these characteristics and will provide the protection necessary. Thoria and beryllia have the disadvantage that both of them are very toxic and therefore the most useful composition is boron nitride. These materials may be deposited on the thermocouple assembly by any one of several methods described in conjunction with the application of the thermocouple materials, but it is the most economical to deposit the thin coating by the vapor deposition method.

FIGS. 3 and 4 show a modification of the present thermocouple which is extremely useful for measuring temperatures within the blast of a rocket engine exhaust. Core 24 may be made of any one of the materials of which the core 11 is constructed. However, it should be noted that the cross-sectional shape of core 24 is oval rather than square. In use, the thermocouple is located with the major axis of the oval substantially parallel to the flow of the rocket blast whereby the streamlined shape of the thermocouple deflects less exhaust gases. Such configuration and orientation is also useful in that the thermocouple is more rigid in the plane parallel to the major axis of the oval cross-sectional shape. Similarly to the first modification core 24 is provided with first and second tapered portions 25 and 26 respectively which taper towards each other and meet at a common forward edge. Also, similar to the first modification, a first thermocouple conductor 27 is affixed to the first tapered portion 25 and extends rearwardly along the core 24 to its rearward end where it is connected to a conductor (not shown) similar to 7 shown in FIG. 1. A second thermocouple conductor 28 is provided, affixed to tapered portion 26 and extends rearwardly along the core 24 to a point where it is connected with a conductor (not shown) similar to conductor 8 in FIG. 1. At their respective forward edges, thermocouple conductor 27 is provided with an interface 29, and thermocouple conductor 28 is provided with interface 30. These interfaces are produced in the same manner as interfaces 17 and 18 shown in FIG. 2 and from the hot junction of the thermocouple. Anyone of the combinations mentioned above may be used for the thin film thermocouple conductors 27 and 28 and further similar to the first modification, the thermocouple conductors 27 and 28 should have a depth of from 1 micron to 1 mil according to which particular combination of thermocouple materials and core materials is used. A dense protective coating composed of any one of the materials of which protective coating 20 may be composed is provided in order to protect the thermocouple conductors 27 and 28 from erosion of the flame gases and from electrical shorting.

With the detailed description above, it is seen that the present thermocouple has many advantages over the previously suggested art. The thin film concept allows a wider range of expansion and contraction of the thermocouple assembly due to very high temperature changes even though the materials which must be used to withstand the temperatures involved are very brittle. This thermocouple has a couple junction of extremely low mass and therefore has a high response. Further, the thin film conducting leg concept allows much less mass to be used to conduct the E.M.F. to a remote galvanometer due to the large surface available for such conduction. The prior thermocouples are not able to make such measurements at such temperatures.

The forms of the invention herein illustrated is to be considered as by way of example only. It will be apparent to those skilled in the art that numerous modifications may be made without departing from the spirit of the invention or the scope of the appended claims.

We claim:
1. A high temperature thermocouple comprising an insulative solid core member, said core member being tapered at its forward end forming a first and a second planar surface portion which meet at a common edge, a first and a second thin film of different thermo-electric materials located on said first and second surface portions respectively, said first and second thermo-electric materials each having an outer forward edge lying in a plane which substantially bisects the angle between said first and second surface portions, said forward edges connected to each other at said common edge forming a hot junction; whereby extremely brittle thermo-electric materials may be used and will expand and contract with said core over wide ranges of temperature changes.

2. The thermocouple as claimed in claim 1 wherein the thin film thermo-electric materials are between 4 microns and 1 mil thick.

3. The thermocouple claimed in claim 1 wherein, the thermo-electric materials are coated with an insulative film coating which is 3 to 4 microns thick at said hot junction.

4. A 5000° F. thermocouple comprising an insulative solid core member having a first and a second angular planar surface portion subtending an angle and meeting at a common forward edge, a first and a second different thin film of thermo-electric material coated on said first and second angular surface portions and extending rearwardly along the respective sides of the core adjoining the respective angular surface portions, said first thermo-electric material selected from a class consisting of boron carbide, tungsten, tungsten carbide, rhenium, carbon, and tantalum; said second thermo-electric material being different than said first thermo-electric material and being selected from the class consisting of graphite, tungsten, tungsten-molybdenum, silicon carbide, tungsten carbide, molybdenum carbide, and molybdenum, said thermo-electric materials each having a forward edge abutting the other, said thermo-electric material forward edges lying in a plane which is oblique to said first and second angular surface portions, whereby the thermocouple will have a rapid response and extremely brittle thermo-electric materials which will expand and contract with the core over wide ranges of temperature changes may be used.

5. A high temperature thermocouple comprising an elongated insulative core member, said core member being tapered at its forward end forming a first and second tapered surface portions which meet at a common edge, bore means formed in said core member adjacent said common edge, for impeding the flow of heat along the elongated insulative core member, a first and a second thin film of thermo-electric material located on said first and second tapered surface portions respectively said thermo-electric materials each having a forward edge lying in a plane which substantially bisects the angle between the tapered surface portions, said forward edges contacting each other at said common edge forming a hot junction, said first thermo-electric material selected from a class consisting of boron carbide, tungsten, tungsten carbide, rhenium, carbon, and tantalum; said second thermo-electric material being different than said first thermo-electric material and being selected from the class consisting of graphite, tungsten, tungsten-molybdenum, silicon carbide, tungsten carbide, molybdenum carbide, and molybdenum.

6. A thermocouple comprising an elongated core member tapered at its forward end providing a first and a second tapered surface portion subtending a 25 to 70° angle and meeting at a common edge, a first thin film thermo-electric material affixed to said first tapered surface portion and extending rearwardly on a first side portion of said core, the forward outer edge of said thermo-electric material lying in a plane which substantially bisects the angle of intersection of the tapered surface portions, a second thin film thermo-electric material being of different material than said first thermo-electric material, affixed to said second tapered surface and extending rearwardly along a second side portion of the core, said second thermo-electric material having a forward outer edge abutting the forward outer edge of said first thermo-electric material forming a hot junction, each of said thermo-electric materials being between 4 microns and one mil thick.

7. A high temperature thermocouple comprising an elongated insulative core member having a first and a second flat surface portion adjoining each other at an end of said core member, a first thin film having a thickness between 4 microns and one mil of thermo-electric material and a second thin film having a thickness between 4 microns and one mil of different thermo-electric material attached to said first and second flat surface portions, respectively, said thermo-electric materials having outer surfaces terminating in respective outer forward edge portions which are constructed and arranged to substantially bisect the angle between said first and second flat surface portions, said edge portions abutting each other and forming a hot junction.

References Cited in the file of this patent

UNITED STATES PATENTS

| | | |
|---|---|---|
| 1,286,429 | Shindel | Dec. 3, 1918 |
| 1,942,516 | Noyes | Jan. 9, 1934 |
| 2,381,819 | Granes et al. | Aug. 9, 1945 |
| 2,562,696 | Canada | July 31, 1951 |
| 2,671,818 | Turck | Mar. 9, 1954 |
| 2,694,098 | Leins | Nov. 9, 1954 |
| 2,757,220 | Carter | July 31, 1956 |

FOREIGN PATENTS

| | | |
|---|---|---|
| 333,311 | Germany | Feb. 22, 1921 |